United States Patent [19]

Wahl

[11] Patent Number: 4,747,156
[45] Date of Patent: May 24, 1988

[54] IMAGE PREPROCESSING PROCEDURE FOR NOISE REMOVAL

[75] Inventor: Friedrich M. Wahl, Langnau am Albis, Fed. Rep. of Germany

[73] Assignee: International Business Machines Corporation, New York, N.Y.

[21] Appl. No.: 875,169

[22] Filed: Jun. 17, 1986

[30] Foreign Application Priority Data

Dec. 17, 1985 [EP] European Pat. Off. ........ 85116114.1

[51] Int. Cl.$^4$ .............................................. G06K 9/40
[52] U.S. Cl. ...................................................... 382/54
[58] Field of Search .................. 382/54; 358/125, 126, 358/284

[56] References Cited

U.S. PATENT DOCUMENTS 4,167,728  9/1979  Sternberg ......................... 340/146.3
4,298,895 11/1981  Arai et al. ............................ 358/284
4,510,618  4/1985  Ataman et al. ........................ 382/54

FOREIGN PATENT DOCUMENTS 0053935  6/1982  Canada .

OTHER PUBLICATIONS

H. S. Hou: "Digital Document Processing", p. 124, John Wiley & Sons, New York, 1983.
G. G. Langdon: "An Introduction to Arithmetic Coding", IBM J. Res. Develop., vol. 28, No. 2, Mar. 1984, pp. 135–149.
A. Rosenfeld, C. M. Park: "Noise Cleaning in Digital Pictures", EASCON '69 Record, pp. 264–273.
W. K. Pratt: Chapter 12.3, "Noise Cleaning", pp. 319–321, out of Digital Image Processing, John Wiley & Sons, New York 1978.
W. K. Pratt: Chapter 12.6, "Median Fileter", pp. 330–333, out of Digital Image Processing, John Wiley & Sons, New York 1978.
A. Rosenfeld, A. C. Kak: "Digital Picture Processing", 2nd Edition, vol. 1, Academic Press, New York; Chapter 6.4, Smoothing, pp. 250–264.

Primary Examiner—Theodore M. Blum
Attorney, Agent, or Firm—F. David LaRaviere; Simon K. Lee; Peter R. Leal

[57] ABSTRACT

A method for removing noise in the form of small black spots in a black and white raster picture, which includes the following steps: Generating a moving window of 5×5 picture elements having an inner window (R1) of nine and a surrounding outer window (R2) of sixteen picture elements; detecting for each such window whether there are more black picture elements in the inner window than a given threshold, or whether there is any connection between black picture elements in the inner window and the outer window; if this is true, leaving the inner window unchanged; otherwise, i.e. if there are less black picture elements in the inner window than the threshold, and if they are not connected to black picture elements in the outer window, making the inner window all white. Thus, isolated small black spots are eliminated without eroding edges or erasing very thin lines.

11 Claims, 3 Drawing Sheets

WINDOW ANALYSIS

FIG. 1 WINDOW MATRIX OF PICTURE ELEMENTS
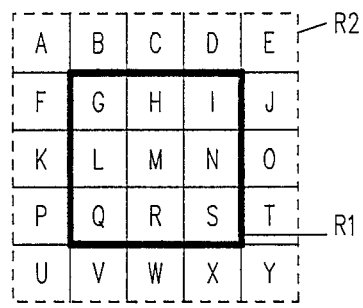
FIG. 2 NEIGHBORHOOD RELATIONSHIPS
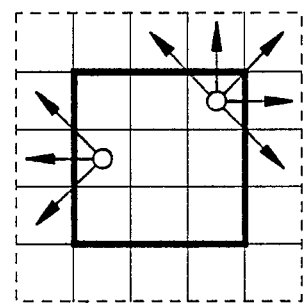
FIG. 3 FLOW DIAGRAM OF NOISE CLEANING PROCEDURE
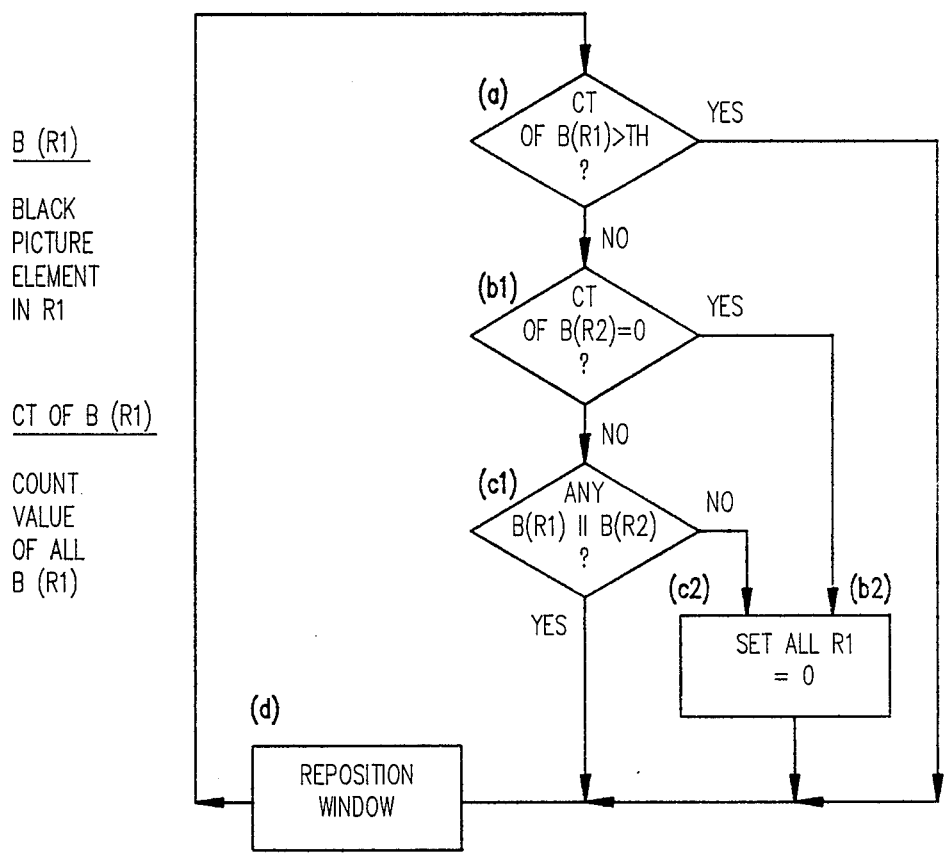

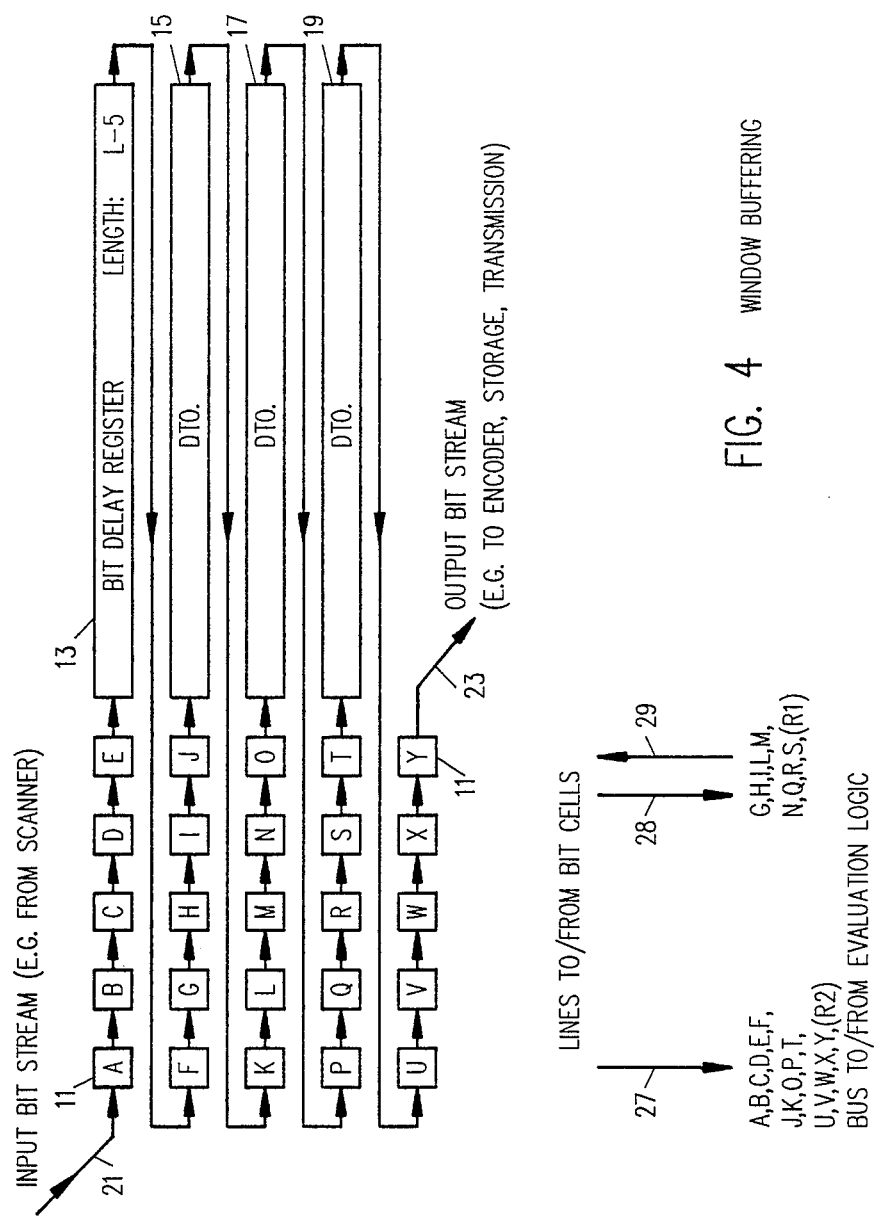
FIG. 4 WINDOW BUFFERING

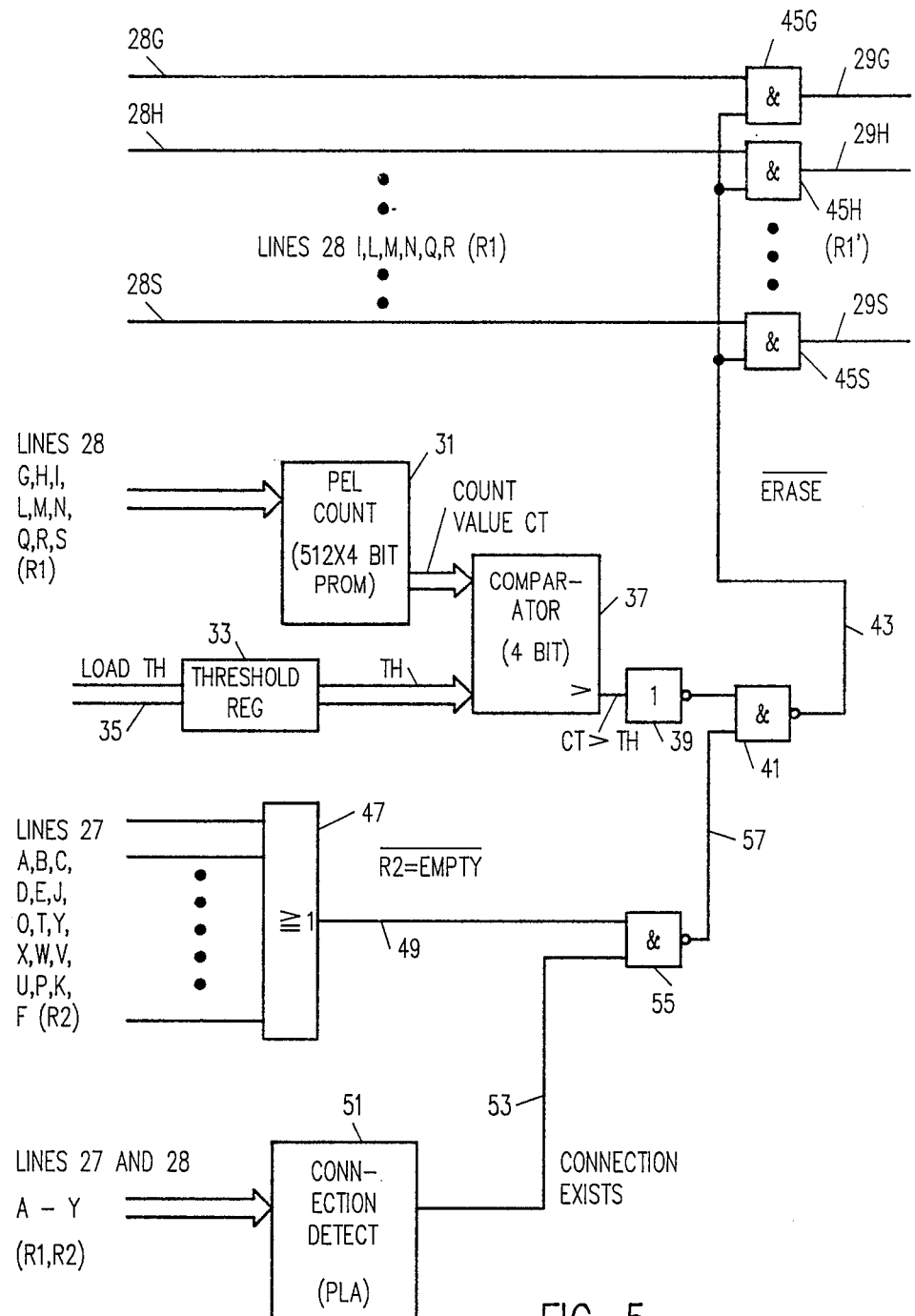
FIG. 5 WINDOW ANALYSIS

IMAGE PREPROCESSING PROCEDURE FOR NOISE REMOVAL

FIELD OF INVENTION

Present invention is concerned with a procedure for preprocessing images represented as a raster pattern of black and white picture elements, for removing noise or small black spots of single black picture elements or small isolated groups of few black picture elements.

BACKGROUND

For the storage and transmission of black and white images, such images are raster scanned and then represented by a matrix of black and white picture elements.

For most printed, typewritten or even handwritten documents, the greater portion of an image of such a document is white (e.g., the space between print lines), and a redundancy reduction is well possible. Methods for such redundance reduction are already known, e.g. from the following publications: H. S. Hou: "Digital Document Processing", pp. 124, John Wiley & Sons, New York 1983.—G. G. Landon: "An Introduction to Arithmetic Coding", IBM. J. Res. Develop. Vol. 28, No. 2, March 1984, pp. 135-149. The amount of data that has to be stored or transmitted for such images can thus be reduced significantly.

A problem with such redundancy reduction procedures is the fact that in certain situations, e.g., if documents were copied several times in sequence, if low quality copying was used, or if a document was transmitted already through a noisy channel, there exists "noise" in the documents which consists of small black spots. As the redundancy reduction process cannot recognize whether a black spot is actual data or noise, it will encode also the noise spots which will result in a heavy degradation of the redundancy reduction.

It is therefore desirable to remove the noise from black and white images after scanning and prior to any further processing.

Some procedures for noise cleaning or removal in images were disclosed in the following publications:
A. Rosenfeld, C. M. Park: "Noise Cleaning in Digital Pictures", EASCON '69 Record, pp. 264-273.—W. K. Pratt: "Digital Image Processing", John Wiley & Sons, New York 1978; Chapter 12.3 "Noise Cleaning" (pp. 319-321) and Chapter 12.6 "Median Filter" (pp. 330-333).—A. Rosenfeld, A. C. Kak: "Digital Picture Processing", 2nd Edition, Vol. 1, Academic Press, New York 1982; Chapter 6.4 "Smoothing" (pp. 250-264).

The noise removal methods described in these papers either use a contracting (shrinking) and reexpanding procedure during which small black areas vanish (they do not reappear during the expansion), or they replace the value of a picture element by the average or median value of its neighborhood picture elements so that black spots close to white areas may vanish.

Each of these noise cleaning methods requires a large amount of computing and processing. Furthermore, they tend to degrade the images because they also change thin lines and erode edges which should remain unmodified in the picture, so that noiseless images may have a reduced quality after processing by these procedures.

OBJECTS OF THE INVENTION

It is a primary object of the invention to devise a procedure for preprocessing of images represented by a raster pattern of black and white picture elements, that allows to remove the noise represented by isolated small black spots with a minimum in processing steps and hardware required.

A further object of the invention is such a noise removal procedure which does not change edges of characters and does not remove very thin lines.

Another object of the invention is such a noise removal method that allows an adaptation to the type of images, to their quality, and to the character of the noise, by modifying the volume of the black spots to be eliminated.

DISCLOSURE OF THE INVENTION

These objects are achieved by the preprocessing procedure of the invention which analyzes a moving window of given size having an inner portion and an outer portion, and which completely removes any black picture elements in the inner window portion if their number is less then a preselected threshold value, but only if they are not connected to any black picture elements in the surrounding outer window portion.

By this method, image data can be preprocessed by simple hardware "on the fly", i.e. in a pipelined manner between image scanning and further processing for redundancy reduction or storage or transmission, and the method does not blur characters or lines nor degrade the quality of pictures which did not contain any noise.

A preferred embodiment of the invention will be described in the following with reference to the drawings.

LIST OF DRAWINGS

FIG. 1 shows a window of picture elements, comprising an inner and an outer window according to the invention;

FIG. 2 shows the same window as that of FIG. 1, illustrating the neighborhood or adjacency relationships between picture elements in the inner and the outer window, as used in present invention;

FIG. 3 is a flow diagram of the invented image preprocessing procedure;

FIG. 4 shows a buffering arrangement for separating the picture elements representing a window; and FIG. 5 is a block diagram of the evaluation logic for implementing the window analysis procedure of the invention.

DETAILED DESCRIPTION (1) Basic Procedure

The basic procedure of the image preprocessing or noise cleaning process of this invention will now be described with reference to the FIGS. 1 to 3.

* The procedure processes and eventually modifies the binary image data within a moving window of 5×5 picture elements, each representing either a white picture element (0) or a black picture element (1). The picture elements (PELs) within a window are denoted as shown in FIG. 1. The nine elements G, H, I, L, M, N, Q, R, S define an inner window R1, whereas an outer window R2 is represented by the sixteen elements A, B, C, D, E, F, J, K, O, P, T, U, V, W, X, Y.

The window is moved over the whole area of the image to be processed. It is shifted column by column from left to right and line by line from top to bottom (each column and line having the width of one picture element).

For each window, the following steps are performed as also shown in the flow diagram of FIG. 3:

(a) Determine whether the number of black picture elements in the inner window R1 is greater than a predetermined threshold TH; if YES, go to step (d); if NO, go to step (b).

(b) Determine whether there is no black picture element in the outer window R2; if YES, set all picture elements in R1 to 0 (white), then go on to step (d); if NO, go to step (c).

(c) Determine whether there is any pair of adjacent black elements, one element being in R1 and the other in R2 (definition of "adjacent pair" given below); if NO, set all picture elements in R1 to 0 (white), then go on to step (d); if YES, go directly to step (d).

(d) Reposition the window (shifting one column to the right, or shifting one line down and going back to first column); then start the evaluation procedure again for the new window.

The definition of an "adjacent pair" is illustrated in FIG. 2. For each of the corner elements G, I, Q, S in the inner window, the five nearest elements in the outer window are considered adjacent elements (e.g. C, D, E, J, O are adjacent to I). For each of the elements H, L, N, R in the inner window, the three nearest elements in the outer window are considered adjacent (e.g. F, K, P are adjacent to L). The core element M in the inner window is not relevant for the adjacency detection. Thus, if there is any pair of elements which are considered adjacent according to this definition and which are both black, there exists a "connection" between the inner and the outer window (YES output of block (c1) in FIG. 3).

In essence, this procedure does the following for each window: It eliminates any black image structure within the inner window which has less than TH black picture elements, if and only if this image structure is not connected to any black picture element in the outer window. If the black image structure in the inner window has more than TH black picture elements, or if it has less but they are connected to black picture elements in the outer window, the structure in the inner window is left unchanged.

It should be noted that the elimination of black picture elements is effective immediately also for the basic total image, i.e. the input for the next window is not taken from the original image pattern but from the recently modified image.

With this procedure, very small isolated black spots which can be considered as noise are eliminated. The observation of adjacencies or connections between black points in the inner and outer window avoids the mutilation of the edges of lines, which would result in a degradation of the image and which occurs in other known noise removal procedures.

(2) Implementation

An implementation of the described image preprocessing or noise removal procedure is illustrated in FIGS. 4 and 5.

FIG. 4 shows one possible realization of window selection circuitry for obtaining a moving window of 5×5 picture elements. It is assumed that the whole image is scanned line by line as in a TV raster so that a stream of sequential bits each representing on picture element is obtained.

The circuitry comprises twenty-five bit storage cells 11 and four delay shift registers 13, 15, 17, 19 each having a capacity of L−5 bits, L being the number of picture elements per line. All these units are arranged in a single sequential shifting arrangement as shown in FIG. 4, with an input line 21 for the bit stream from the image scanner and an output line 23 which is connected to the utilization device which may be an image encoder, a storage unit, or any transmission equipment.

For connection to the evaluation circuitry which is shown in FIG. 5, an output line 27 is provided for each of the cells 11 which store the outer window R2 (A, B, C, D, E, F, J, K, O, P, T, U, V, W, X, Y) in the storage array, and an output line 28 as well as an input line 29 for the cells 11 which store the inner window R1 (i.e. G, H, I, L, M, N, Q, R, S). The input lines 29 serve for writing back modified picture elements (all white); instead of writing back 0 values to the bit cells of the inner window, one could of course inhibit the output of these cells during the following shift operation so that 0 values (white picture elements) would result. In another alternative, bidirectional bus lines and respective gating circuitry could be provided instead of separate unidirectional output and input lines 28 and 29.

Instead of using the shifting arrangement shown in FIG. 4 for obtaining a moving window of picture elements, one could as well use a bit-addressable random access memory storing the whole image, plus respective address generation logic for extracting the nine and sixteen picture elements representing the inner window R1 and the outer window R2, respectively. Addresses could be increased stepwise (as in a counter) for moving the window; readout of twenty-five binary values A . . . Y, and write-back of possibly changed nine binary values G, H, I, L, M, N, Q, R, S would be done sequentially using these addresses.

An implementation of the evaluation logic for the window analysis is shown in FIG. 5. It comprises a PEL count unit 31 for counting the black picture elements in the inner window. Its nine inputs are connected to the nine output lines 28 from the bit cells of the inner window (G, H, I, L, M, N, Q, R, S). This count unit is a 512×4 bit PROM which provides a 4-bit count value for each of the 512 possible different input combinations. The count value CT furnished at the output of unit 31 may be any number between 0 and 9. A threshold register 33 is provided for holding a preselected threshold value TH which can also be between 0 and 9 and which is loaded via input lines 35. A comparator unit 37 compares the two 4-bit values CT and TH and issues a logic "1" on its output if CT TH. This binary output signal is inverted in inverter circuit 39 which furnishes the complement value to NAND gate 41 which has an output line 43.

Nine AND gates 45 are provided for modifying the nine picture elements G, H, I, L, M, N, Q, R, S furnished on lines 28 from the inner window cells, in response to the binary control signal on line 43. If this signal is "0" (erase), the nine AND gates 45 furnish logical "0"s on output lines 29 which means that all picture elements of the inner window are made white. Otherwise (logical "1" on line 43) the nine picture elements are gated unchanged from storage output lines 28 to storage input lines 29.

OR circuitry 47 is connected to the sixteen output lines 27 from the bit cells storing the outer window and furnishes on its output line 49 a logical "1" if any one of the picture elements in the outer window is black (R2 not empty).

A connection detect unit 51 receives the signals from all twenty-five bit cell output lines 27 and 28 to determine whether any connection exists between the inner and outer window, i.e. whether there is a pair of adjacent picture elements (one in the inner and one in the outer window) which are both black. A logical "1" is furnished on line 53 if such connection exists. Connection detect unit 51 can be implemented as programmed logic array (PLA) which contains an AND gate for each possible pair of adjacent picture elements (as defined in connection with FIG. 2) and in which the outputs of all the AND gates are ORed to obtain a single output.

The logic signals on lines 49 and 53 are combined in NAND gate 55 which furnishes its output signal on line 57 to NAND gate 41. Thus an erase signal (logic "0") will be furnished on line 43 if there is no black picture element at all in the outer window, or if no connection exists between any black picture element in the inner window and one in the outer window (but only if inverter 39 furnishes a logic "1" which means that for the inner window, count CT is not greater than threshold TH).

(3) Results

The procedure was applied to the signals representing the copy of a file card which was scanned at 200 lines per inch. Depending on the threshold chosen (i.e. the size of the smallest spots to remain in the image, given in number of picture elements), between 654 and 875 small black spots could be eliminated. In connection with a given redundancy reduction process, this resulted in an improvement of the compression of ca. 10%. The number and distribution of spots on these documents could be considered average for a normal copy. For more noisy images, e.g. those obtained when a document is copied several times in succession, even higher improvements in the resulting compression rate can be obtained.

(4) Modifications, Alternatives

As was indicated already, the threshold value TH, i.e. the minimum number of black picture elements that constitute a spot to be left in the image, can be varied to adapt to the type of document and its quality for obtaining optimal results.

Another possiblity is a variation of the window size. Instead of an inner window having size 3×3, one could also choose a size of e.g. 2×2 or 4×4, both with an outer window which is a frame having the width of one picture element (as shown in the described embodiment). The best size would have to be found out experimentally. However, it appears that for a mixture of documents of different quality and nature, the best choice is the 5×5 window with an inner window having 3×3 picture elements as described.

The adjacency relationship could also be defined differently, e.g. by requiring more than one connected pair of black picture elements instead of requiring only one pair, or by introducing a different definition of an adjacent pair, e.g. by considering only horizontal and vertical neighbor picture elements (4-neighborhood) instead of all horizontal, vertical, and diagonal neighbor picture elements (8-neighborhood) as is done in the embodiment described.

(5) Conclusion

The image preprocessing procedure of the invention reduces noise in scanned documents and scanned graphic images. It improves the appearance of binary images without degrading characters (symbols) and drawing elements. Documents of good quality remain unaffected by this preprocessing procedure. Substantial savings in the amount of data necessary to represent the documents as compressed image data can be achieved in case of severe noise distortions. The procedure can be implemented at low cost by simple hardware so that it appears attractive to integrate such a preprocessor in document scanning devices.

I claim:

1. A method for improving an image represented by a raster pattern of black and white picture elements, for removing noise, characterized by the steps of:
    scanning the image to obtain for successive window areas an inner window (R1) and a surrounding outer window (R2) of black and white pixels, both windows having a given size;
    detecting for each such window area
    (a) whether the number (CT) of black picture elements in the inner window exceeds a given threshold value (TH), and
    (b) whether any black picture element exists in the outer window and whether a black picture element in the inner window is connected to at least one black picture element in the other window;
    determining, in dependence of the results of the detecting steps a and b, the contents of the respective window for further processing, by either maintaining the picture elements of the respective inner window of the input image unchanged, or by modifying them according to a given rule.

2. A method of preprocessing an image represented by a raster pattern of black and white binary picture elements, for removing small isolated black spots, characterized by the steps of:
    (a) scanning the image to obtain for each one of successive overlapping windows an inner window (R1) of close neighborhood picture elements and an outer window (R2) of picture elements surrounding said inner window;
    (b) detecting for each such inner window whether the number (CT) of black picture elements exceeds a given threshold value (TH), and
    (b1) leaving the contents of said inner window unchanged if the number of black picture elements is above the threshold, but
    (b2) if the number of black picture elements in the inner window is not above the threshold, going to step (c);
    (c) detecting whether a black picture element in the inner window is substantially connected to at least one black picture element in the outer window, and
    (c1) if a black element in the inner window is substantially connected to at least one black picture element in the outer window exists, leaving the contents of the inner window unchanged, but
    (c2) replacing all black picture elements by white picture elements in the inner window if no exists between black picture elements in the inner window and black picture elements in the outer window, and using the new binary values of the modified picture elements for subsequent windows instead of their original values.

3. A method in accordance with claim 1, characterized in that the inner window has a size of n×n picture elements, and the outer window has the form of a frame having a dimension of (n+2)×(n+2) picture elements.

4. A method in accordance with claim 3, characterized in that n=3.

5. A method in accordance with claim 1, characterized that for modifying the contents of the inner window, all picture elements in the inner window are made white.

6. A method in accordance with claim 1, characterized in that no modification is made if the number (CT) of black picture elements in the inner window exceeds the given threshold (TH), or if the threshold is not exceeded but any black picture element in the inner window is connected to at least one black picture element in the outer window.

7. A method in accordance with claim 1, characterized in that for considering a picture element in the outer window to be connected to a picture element in the inner window, it must be in direct horizontal, vertical, or diagonal connection with the respective picture element in the inner window.

8. A method in accordance with claim 6, characterized in that for considering a picture element in the outer window to be connected to a picture element in the inner window, it must be in direct horizontal, vertical, or diagonal connection with the respective picture element in the inner window.

9. A method in accordance with claim 5, characterized in that no modification is made if the number (CT) if black picture elements in the inner window exceeds the given threshold (TH), or if the threshold is not exceeded but any black picture element in the inner window is connected to at least one black picture element in the outer window.

10. A method in accordance with claim 9, characterized in that for considering a picture element in the outer window to be connected to a picture element in the inner window, it must be in direct horizontal, vertical, or diagonal connection with the respective picture element in the inner window.

11. A method in accordance with claim 1, characterized in that the movements of the window area are made in increments of one picture element, and that the modifications made in the contents of one window are effective for the following windows containing the same picture elements.

* * * * *

UNITED STATES PATENT AND TRADEMARK OFFICE
CERTIFICATE OF CORRECTION

PATENT NO. : 4,747,156

DATED : May 24, 1988

INVENTOR(S) : F. M. Wahl

It is certified that error appears in the above-identified patent and that said Letters Patent is hereby corrected as shown below:

Col. 6, line 59, after "no", insert -- connection --.

Signed and Sealed this

Twentieth Day of December, 1988

*Attest:*

DONALD J. QUIGG

*Attesting Officer*  *Commissioner of Patents and Trademarks*